United States Patent
Miyazaki et al.

(10) Patent No.: US 8,872,503 B2
(45) Date of Patent: Oct. 28, 2014

(54) ELECTROMAGNETIC WAVE RESONATOR AND ITS FABRICATION PROCESS AS WELL AS ELECTROMAGNETIC WAVE GENERATOR

(75) Inventors: Hideki Miyazaki, Tsukuba (JP); Hiroshi Miyazaki, Sendai (JP); Hiroki Ebe, Utsunomiya (JP)

(73) Assignee: National Institute for Materials Science, Tsukuba-Shi (JP)

( * ) Notice: Subject to any disclaimer, the term of this patent is extended or adjusted under 35 U.S.C. 154(b) by 223 days.

(21) Appl. No.: 13/581,579

(22) PCT Filed: Mar. 2, 2011

(86) PCT No.: PCT/JP2011/054692
§ 371 (c)(1),
(2), (4) Date: Aug. 28, 2012

(87) PCT Pub. No.: WO2011/108562
PCT Pub. Date: Sep. 9, 2011

(65) Prior Publication Data
US 2012/0326702 A1 Dec. 27, 2012

(30) Foreign Application Priority Data
Mar. 2, 2010 (JP) ................................ 2010-045130

(51) Int. Cl.
*G01R 19/00* (2006.01)
*G02F 1/21* (2006.01)
(52) U.S. Cl.
CPC .............. *G02F 1/21* (2013.01); *G02F 2203/10* (2013.01)
USPC ...................................................... 324/76.12
(58) Field of Classification Search
CPC ................... A23L 1/0121; H03H 7/40; H03H 2001/0057; H02J 17/00; H01F 2003/005
See application file for complete search history.

(56) References Cited

U.S. PATENT DOCUMENTS 4,801,862 A * 1/1989 Osaki et al. ................... 324/631
6,034,809 A 3/2000 Anemogiannis
(Continued)

FOREIGN PATENT DOCUMENTS

JP 2005-079700 A 3/2005
JP 2005-530328 A 10/2005
(Continued)

OTHER PUBLICATIONS

Hiroki Ebe et al., "Konojigata Nanosheet Plasmon Kyoshinki No Denba Zokyo Tokusei No Kaiseki", Extended Abstracts, Japan Society of Applied Physics and Related Societies, vol.
(Continued)

*Primary Examiner* — Tung X Nguyen
(74) *Attorney, Agent, or Firm* — Manabu Kanesaka

(57) ABSTRACT

The main object of the invention is to provide an electromagnetic wave resonator making use of surface waves: an electromagnetic wave resonator structure capable of being achieved with existing technologies yet without much difficulty and applying voltage to a positive dielectric area, thereby overcoming a variety of problems arising from the fact that only thermal excitation is available.

The contact structure of negative dielectric/positive dielectric/negative dielectric necessary for this type of electromagnetic wave resonator is provided on the surface of the negative dielectric material 1 just as the coaxial structure of the positive dielectric thin film 3 extending in the Y-axis direction and the negative dielectric material 2 received therein is cut in the axial direction. This makes sure both negative dielectric materials 1 and 2 with the positive dielectric thin film 3 sandwiched between them are electrically insulated so that voltage can be applied to the positive dielectric thin film 3, and ensures that an area provided in the negative dielectric material 1 to receive the positive dielectric thin film 3 has an aspect ratio $D/P_1$ of about 1.9, a figure well achievable in the state of the art.

30 Claims, 10 Drawing Sheets

(56) References Cited

U.S. PATENT DOCUMENTS

| | | | |
|---|---|---|---|
| 2005/0046524 A1* | 3/2005 | Sasaki | 333/238 |
| 2005/0179366 A1 | 8/2005 | Rose et al. | |
| 2005/0269578 A1 | 12/2005 | Barnes et al. | |
| 2009/0295510 A1 | 12/2009 | Miyazaki et al. | |

FOREIGN PATENT DOCUMENTS

| | | |
|---|---|---|
| JP | 2005-535121 A | 11/2005 |
| WO | 99/49353 A1 | 9/1999 |
| WO | WO 2006/093056 A1 | 9/2006 |

OTHER PUBLICATIONS

Miyazaki, H.T., et al., "Thermal Emission of Two-Color Polarized Infrared Waves From Integrated Plasmon Cavities", Applied Physics Letters, 2008, vol. 92, pp. 141114-1-1411114-3.

John Lambe et al., "Light Emission From Inelastic Electron Tunneling", Physical Review Letters, vol. 37 No. 14, Oct. 4, 1976, pp. 923-925.

Yoichi Kurokawa, "Metal-Insulator-Metal Plasmon Nanocavities: Analysis of Optical Properties", Physical Review B75, 035411 (2007), pp. 035411-1-035411-13.

WIPO, International Search Report for PCT/JP2011/054692, Apr. 5, 2011.

Europe Patent Office, "Search Report for EP 11750671.7," Jul. 9, 2014.

Chen, J. et al., "Magnetic resonant cavity composing of a three layered plasmonic nanostructure," Metamaterials, 2008, pp. 204-206, International Workshop On, Piscataway, NJ, USA.

Kuttge, M. et al., "Fabry-Perot resonators for surface plasmon polaritons probed by cathodoluminescence," Applied Physics Letters, 2009, p. 183104, vol. 94, No. 18, American Institute of Physics, USA.

Lan, Y. et al., "Resonant tunneling effects on cavity-embedded metal film caused by surface-plasmon excitation," Optics Letters, 2009, pp. 25-27, vol. 34, No. 1, Optical Society of America, USA.

* cited by examiner

ELECTROMAGNETIC WAVE RESONATOR AND ITS FABRICATION PROCESS AS WELL AS ELECTROMAGNETIC WAVE GENERATOR

RELATED APPLICATIONS

The present application is National Phase of International Application No. PCT/JP2011/054692 filed Mar. 2, 2011, and claims priority from Japanese Application No. 2010-045130, filed Mar. 2, 2010.

BACKGROUND OF THE INVENTION

1. Field of the Invention

The present invention relates to an electromagnetic wave resonator that is used for boosting up an electromagnetic field in various frequency ranges such as microwaves, millimeter waves, teraHz waves, infrared radiation, visible rays and ultraviolet radiation, and has dimensions equal to or smaller than wavelengths, and its fabrication process as well as an electromagnetic wave generator device using the same. Among others, the invention relates to an electromagnetic wave resonator formed of a metal material for use in the infrared to ultraviolet light ranges.

2. Description of the Prior Art

An electromagnetic wave resonator is a device essentially required for the generation and amplification of coherent electromagnetic waves, frequency selection, high-sensitivity electromagnetic wave detection due to a boosted-up electromagnetic field, and the development of various nonlinear effects.

In particular, an electromagnetic wave resonator making use of surface waves present at a negative/positive dielectric interface has attracted a great deal of attention as a structure having a particularly large electromagnetic wave generation effect or the like, because a large electromagnetic field may be confined within a small volume.

In present disclosure, the "positive dielectric material" is defined as having a positive value for its real part of dielectric constant, and the "negative dielectric material" as having a negative value for its real part of dielectric constant. The positive dielectric material corresponds to general nonmetallic materials such as glasses, ceramics, semiconductors, polymers, and liquids. According to the above definition, air, other gases and vacuum voids may be called the positive dielectric material too. On the other hand, the negative dielectric material implies that an object comprising a specific material has such properties as described above in a specific frequency zone alone. Typical of this is a metallic material in a frequency range lower than a plasma frequency, say, in a visible ray or infrared range. Besides, there is the mention of materials capable of developing resonance of large lattice vibrations such as silicon carbide and various ionic crystals in the far-infrared to teraHz range, superconducting materials that can be in a superconducting state in the teraHz to microwave range lower in frequency than the superconducting energy gap, and silicon or other semiconductor materials having excited carriers.

The "surface wave" here is understood to refer to an electromagnetic wave mode in which the amplitude of its electromagnetic field has a maximum value at an interface, and which has a distribution profile that attenuates exponentially with an increasing distance from the interface, and propagates along the interface. With a metallic material used as the negative dielectric material, the surface wave in the infrared and visible ray range is called the surface plasmon or surface plasmon-polariton; and with silicon carbide or various ionic crystals used as the negative dielectric material, the surface wave in the teraHz or infrared range is called the surface polariton or surface phonon-polariton.

A typical electromagnetic wave generator using such an electronic magnetic resonator is disclosed in Patent Publication 1 showing an infrared generator device using metal rectangular cavities as a resonator. This device is operable to heat a lattice having an array of metal rectangular cavities thereby inducing surface plasmon resonance in the resonator so that thermal emission of infrared radiation having a specific wavelength is boosted up.

[Problem with Resonator Fabrication]

For a conventional metal rectangular cavity type electromagnetic wave resonator, however, there was the need for achieving resonance at a given wavelength by fabricating a microstructure having a narrow width and a large depth or a high aspect (depth/width) ratio. According to Patent Publication 1, for instance, there is the need for the structure: an aspect ratio of 9.2 with a width of 0.041 μm and a depth of 0.378 μm for the purpose of obtaining a wavelength of 2.52 μm; an aspect ratio of 6.6 with a width of 0.1 μm and a depth of 0.66 μm for the purpose of obtaining a wavelength of 4.0 μm; and an aspect ratio of 7.3 with a width of 0.155 μm and a depth of 1.13 μm for the purpose of obtaining a wavelength of 6.0 μm. In any structure, the width is way too small to achieve with ordinary photolithography, and the aspect ratio is way too high to achieve with ordinary etching or mold transfer. Such a structure would not be easy to achieve because of the need for special contrivances.

[Fundamental Problem with Heat Radiation]

There were some problems arising from the use of heat radiation phenomenon as the principle of generating electromagnetic waves from the resonator. The maximum intensity obtained from heat radiation is strictly limited by Planck's law. Although making the resonator temperature high is essentially necessary for obtaining high-intensity radiation, materials available for that purpose were limited to those having high heat resistance, resulting in many design restrictions. Maintaining such a microstructure having a high aspect ratio as mentioned above in high-temperature environments and repetitive heating/cooling cycles resulted in stringent robustness demands. Generally in electromagnetic wave resonators, there are discrete resonances of various orders appearing unavoidably; however, all of them contributed to radiation by Planck's law, ending up with the inability to radiate a wavelength of a specific order alone. In addition, when an infrared generator device is used with analyzer systems, the luminance of a light source has often been modulated for lock-in detection enabling high-sensitivity detection; however, a conventional light source was slow to respond because of the use of heat as an energy source, rendering efficient analysis difficult.

[Problem Arising from the Fact that there was No Option but to Rely Upon the Heat-Radiation Principle]

So far, the fact that there was no option but to rely upon heat radiation in principle was originated from the rudimental structure of a resonator. Apart from heat radiation, there are other light-emitting mechanisms used for light emitters such as recombination emission of electrons and holes in semiconductors, electroluminescence, cathode luminescence and tunnel emission in inorganic or organic materials, or the like, and for all of them, there is the need of passing currents through the positive dielectric part. In the conventional resonator structure, however, negative dielectric areas surrounding a positive electric area were all linked to and in conduction with one another, making it impossible to apply voltages to the positive dielectric area thereby passing currents through it. For that reason, such a variety of light-emitting mechanisms cannot yet be utilized.

The tunnel light-emission phenomenon is described in Non-Patent Publication 1, but the incorporation of a tunnel light-emission device into a resonator structure is not shown in it. This publication shows light emission experiments at low temperatures; however, many studies made later have revealed that similar light emission takes place even at room temperature.

A physical phenomenon underlying an electromagnetic resonator is resonance that occurs by the reflection of surface waves propagating through a slab waveguide having a positive dielectric film core clad by a negative dielectric material off the end face of the waveguide. While the details of this resonance phenomenon are described in Patent Publication 2 and Non-Patent Publication 2, it has generally such features as mentioned below.

There are multiple modes of surface waves present on the slab waveguide having a positive dielectric core clad by a negative dielectric material, among which the lowest order of surface wave is useful. More specifically, useful is the surface wave of the mode that has an electric field component vertical to the positive/negative dielectric interface and no cutoff frequency. One feature of this surface wave is that it has the same electromagnetic field symmetry as a plane wave propagating in a free space (that refers to a space outside of the waveguide irrespective of whether it is air, a vacuum, a liquid or the like) so that it can easily be excited only by irradiation with the plane wave from the end face of the waveguide or, conversely, an electromagnetic wave can be emitted from the end face into the free space. Another feature is that its wavelength $\lambda_P$ is shorter than vacuum wavelength $\lambda_O$ when it propagates in a vacuum, and the smaller the core thickness T, the shorter the wavelength $\lambda_P$ becomes. Specific relations between the vacuum wavelength $\lambda_O$ and the wavelength $\lambda_P$ of the surface wave are shown in formula form in Patent Publication 2.

Once such a surface wave has arrived at the end face of the waveguide, it is reflected off there, again going back to the waveguide. The then reflectivity grows higher as the core thickness T gets smaller. What phase relation the incident wave is reflected in is determined depending on the state of the end face. When the front of the end face is covered with the dielectric material (called the open end), the incident wave is reflected in such a phase relation that the electric field reaches a maximum at the interface. Accordingly, when both ends in the propagation direction remain open, there is going to be resonance of surface waves having discrete wavelengths $\lambda_P$ such that the waveguide length L in the XZ section matches $(1/2)\lambda_P$, $(2/2)\lambda_P$, $(3/2)\lambda_P$, . . . . It follows that such a waveguide works as a resonator for surface waves having those wavelengths. Strictly speaking, however, the electric field does not precisely reach a maximum at the open end: there are more or less deviations. For this reason, design should be carried out with some correction (the same as end correction famous for columnar resonance). If Maxwell equations are strictly calculated by proper numerical calculations to find out a condition under which the electromagnetic energy built up within and near the positive dielectric core reaches a maximum, it is then possible to precisely determine a waveguide length just where the electromagnetic waves of the desired vacuum wavelength $\lambda_O$ resonate.

What has been described just above is the resonance phenomenon disclosed in Patent Publication 2, but the practical assumption of Patent Publication 2 was that the slab waveguide takes on a linear form in the XZ section. In other words, this publication does not give any suggestion about whether or not resonance is maintained when the slab waveguide has a shape other than the linear one.

LISTING OF THE PRIOR ARTS

Patent Publications

Patent Publication 1: WO 2007/139022 A1
Patent Publication 2: WO 2006/093056 A1

Non-Patent Publications

Non-Patent Publication 1:
J. Lambe and S. L. McCarthy, "Light Emission from Inelastic Electron Tunneling", Physical Review Letters, Volume 37, Number 14, pp. 923-925, 1976
Non-Patent Publication 2:
Y. Kurokawa and H. T. Miyazaki, "Metal-Insulator-Metal plasmon nanocavities: Analysis of optical properties", Physical Review B. Volume 75, Number 3, 035411, 2007

SUMMARY OF THE INVENTION

Object to be Accomplished by the Invention

An object of the invention is to provide an electromagnetic resonator structure making use of surface waves, which is achievable with existing technologies yet without much difficulty, and in which voltage is applied to a positive dielectric area thereby overcoming the aforesaid problems stemming from the state of the art where thermal excitation is only available.

Means for Accomplishing the Object

The aforesaid object is accomplishable by the aspects given just below.

Aspect 1 of the invention provides an electromagnetic wave resonator making use of a surface wave, which comprises the following (a), (b) and (c):

(a) a first negative dielectric material which, when a main direction in and out of which an electromagnetic wave goes is defined by a Z-axis direction of a three-dimensional coordinate system comprising X-, Y- and Z-axes, has a groove extending in a Y-axis direction on a surface turning in a plus Z-direction, (b) a positive dielectric thin film provided on an internal surface of the groove on the surface of said first negative dielectric material, and (c) a second negative dielectric material provided on a groove formed by a surface of said positive dielectric thin film facing away from said first negative dielectric material.

In Aspect 2 of the invention, there is an electromagnetic wave resonator of Aspect 1 provided, wherein the surface of said first negative dielectric material is provided with a plurality of said grooves in the X-axis direction.

In Aspect 3 of the invention, there is an electromagnetic wave resonator of Aspect 2 provided, wherein said plurality of said grooves are periodically arranged.

In Aspect 4 of the invention, there is an electromagnetic wave resonator of any one of Aspects 1 to 3 provided, wherein said groove has a plurality of areas having different widths.

In Aspect 5 of the invention, there is an electromagnetic wave resonator of Aspect 4 provided, wherein said plurality of areas each extend continuously a certain length in the Y-axis direction.

In Aspect 6 of the invention, there is an electromagnetic wave resonator of Aspect 5 provided, wherein a length of said plurality of areas in the Y-axis direction is set ½ times to 3/2 times as long as a wavelength $\lambda_P$ of the surface wave.

In Aspect 7 of the invention, there is an electromagnetic wave resonator of any one of Aspects 1 to 6 provided, wherein said positive dielectric thin film has a thickness 10 nm to 0.2 nm.

In Aspect 8 of the invention, there is an electromagnetic wave resonator of any one of Aspects 1 to 7 provided, wherein said first negative dielectric material and said second negative dielectric material are electrically conductive, and electrically insulated from each other.

In Aspect 9 of the invention, there is an electromagnetic wave resonator of Aspect 8 provided, wherein said first negative dielectric material and said second negative dielectric material are each a metal.

In Aspect 10 of the invention, there is an electromagnetic wave resonator of any one of Aspects 1 to 9 provided, wherein another film is interposed partly between said first and said second negative dielectric material and said positive dielectric thin film, or said positive dielectric thin film is made thicker in one area than in another area.

In Aspect 11 of the invention, there is provided a process of fabricating an electromagnetic wave resonator making use of a surface wave, which comprises the following steps (a) to (d):
(a) providing a linearly extending groove on a surface of a first negative dielectric material,
(b) providing a positive dielectric thin film on a surface of said first negative dielectric material,
(c) providing a second negative dielectric material on said positive dielectric thin film, and
(d) removing said second negative dielectric material flatly from its surface, thereby removing said second negative dielectric material except a portion thereof filled in a groove formed by at least a surface of said positive dielectric thin film.

In Aspect 12 of the invention, there is a process of Aspect 11 provided, wherein said step (b) is implemented by an atomic layer deposition method, a chemical vapor deposition method, sputtering or an evaporation method.

In Aspect 13 of the invention, there is a process of Aspect 11 provided, wherein said step (b) is implemented by oxidizing or nitriding the surface of said first negative dielectric material to form a thin film of an oxide or nitride.

In Aspect 14 of the invention, there is a process of Aspect 11 provided, wherein said step (d) is implemented by a chemomechanical polishing method or plasma etching.

In Aspect 15 of the invention, there is a process of any one of Aspects 11 to 14 provided, wherein a part of said second negative dielectric material is removed to expose a part of the surface of said positive dielectric thin film.

In Aspect 16 of the invention, there is provided a process of fabricating an electromagnetic wave resonator making use of a surface wave, which comprises the following steps (a) to (f):
(a) providing a linearly extending projection on a surface of a substrate,
(b) providing a positive dielectric thin film on the surface of said substrate,
(c) providing a first negative dielectric material on said positive dielectric thin film,
(d) removing said substrate,
(e) providing a second negative dielectric material on said positive dielectric thin film from which said substrate has been removed, and
(f) removing said second negative dielectric material flatly from its surface, thereby removing said second negative dielectric material except a portion thereof filled in a groove formed by at least a surface of said positive dielectric thin film on said second negative dielectric material side.

In Aspect 17 of the invention, there is a process of Aspect 16 provided, wherein said step (b) is implemented by an atomic layer deposition method, a chemical vapor deposition method, sputtering or an evaporation method.

In Aspect 18 of the invention, there is a process of Aspect 16 provided, wherein said substrate is silicon, and said step (b) is implemented by forming an oxide, nitride or carbide of said silicon.

In Aspect 19 of the invention, there is a process of Aspect 16 provided, wherein said step (f) is implemented by a chemomechanical polishing method or plasma etching.

In Aspect 20 of the invention, there is a process of any one of Aspects 16 to 19 provided, wherein a part of said second negative dielectric material is removed to expose a part of the surface of said positive dielectric thin film.

In Aspect 21 of the invention, there is provided a process of fabricating an electromagnetic wave resonator making use of a surface wave, which comprises the following steps (a) to (c):
(a) providing a stripe comprising a second negative dielectric material linearly on a surface of a substrate,
(b) providing a positive dielectric thin film on the surface of said substrate provided with said stripe, and
(c) providing a first negative dielectric material on a surface of said positive dielectric thin film.

In Aspect 22 of the invention, there is a process of Aspect 21 provided, which further comprises the following step (d):
(d) removing said substrate.

In Aspect 23 of the invention, there is a process of Aspect 22 provided, which further comprises the following step (e):
(e) flatly removing a surface appearing by removal of said substrate.

In Aspect 24 of the invention, there is a process of Aspect 23 provided, wherein said step (e) is implemented by a chemomechanical polishing method or plasma etching.

In Aspect 25 of the invention, there is a process of any one of Aspects 21 to 24 provided, wherein said step (b) is implemented by an atomic layer deposition method, a chemical vapor deposition method, sputtering or an evaporation method.

In Aspect 26 of the invention, there is a process of any one of Aspects 21 to 25 provided, wherein a part of said first negative dielectric material is removed to expose a part of the surface of said positive dielectric thin film.

In Aspect 27 of the invention, there is an electromagnetic wave generator device provided, wherein a voltage is applied between said first negative dielectric material and said second negative dielectric material in the electromagnetic wave resonator of any one of Aspects 1 to 10.

In Aspect 28 of the invention, there is an electromagnetic wave generator device of Aspect 27 provided, wherein the voltage is set such that an energy of electrons produced by voltage application becomes 100 to 170% of an energy of photons in an electromagnetic wave having a resonance wavelength of said electromagnetic wave resonator.

In Aspect 29 of the invention, there is provided a tunnel light-emission light source used with a voltage applied between said first negative dielectric material and said second negative dielectric material of the electromagnetic wave resonator of in any one of Aspects 4 to 6, characterized in that applied voltages corresponding to different resonance wavelengths of a plurality of areas having different widths in said groove are switched, thereby permitting only a desired area to emit out light.

In Aspect 30 of the invention, there is provided an analyzer used with a voltage applied between said first negative dielectric material and said second negative dielectric material in the electromagnetic wave resonator of any one of Aspects 4 to 6, characterized in that emission wavelengths are preset for a plurality of areas having different widths in said groove, and applied voltages corresponding to the respective emission wavelengths are switched, thereby permitting only the preset wavelengths to be emitted for detection.

Advantages of the Invention

The inventive electromagnetic wave resonator is easier to fabricate than ever before, because the width and depth to be processed remain relatively large, and the aspect ratio remains about 2 at most. This would contribute much to cost reductions, enabling the resonator to be used in a variety of applications.

The inventive electromagnetic wave resonator makes it possible to provide electrical insulation between two negative dielectric areas; so it could be applied to electromagnetic wave generator devices making use of diverse light-emission mechanisms such as recombination light emission of electrons and holes in semiconductors, and electroluminescent, cathode luminescent, and tunnel light emission in inorganic or organic materials.

Among others, when the inventive resonator is applied to an electromagnetic wave generator device making use of tunnel emission, it emits out light even at room temperature by mere application of voltage; so there is no need for using a material of high heat resistance, and there is an increased design flexibility enough to facilitate making sure the reliability of the device. With tunnel emission devices studied so far in the art, emission is feeble because of no incorporation of any resonator structure; with the invention, however, there would be an expectation that practical light emission is obtainable from an enhanced action of the resonator on radiation fields. In addition, fast luminance modulation would also be feasible by voltage modulation, because the energy source involved is the energy of electrons rather than heat.

In tunnel emission, the emission spectra are known to change depending on applied voltage. In a specific resonator embodiment of the invention, as the applied voltage is set at a value corresponding to just one resonance wavelength, it would enable only the resonance wavelength of that specific order to be radiated out.

MODES FOR CARRYING OUT THE INVENTION

Figure 1:
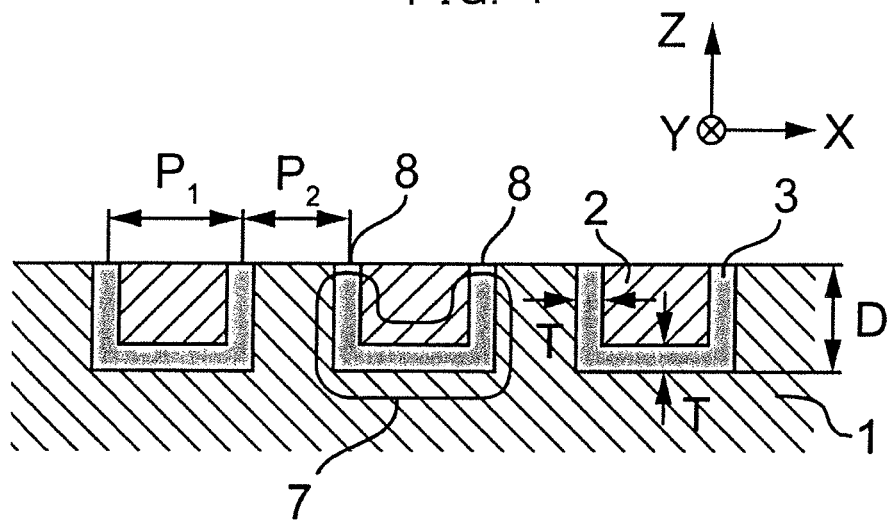
FIG. 1 is illustrative in the XZ section of the electromagnetic wave resonator that is the first example of the invention.

Preferable embodiments of the invention will now be explained in details with reference to the drawings. For an easy understanding of the drawings, dimensional ratios within each or the component and between the components are arbitrarily set. Referring to a common coordinate system, suppose now that the main direction, in and out of which electromagnetic waves go, is defined along the Z-axis, the free space spreads out in the plus Z-direction, the Z-axis is oriented such that the resonator is located in the minus Z-direction, and the mutually orthogonal X- and Y-axes are taken in a plane orthogonal to that orientation. In general, electromagnetic waves enter and leave a resonator with a certain angle distribution; in the present disclosure, its average propagation direction is called the main direction.

While typical examples of the invention will be explained with reference to electromagnetic waves in the infrared to visible light ray ranges, the negative dielectric material comprising a metallic material, and surface plasmon used as surface waves, it is to be understood that if suitable materials are selected depending on a specific frequency band and the wavelength of electromagnetic waves in that band are taken into account, then the invention may be applied to a broad range of general electromagnetic waves inclusive of microwaves, and teraHz waves. While some metals will be specifically named in the following examples, it is to be understood that they may be replaced by gold, silver, copper, aluminum, tungsten, platinum, palladium, and nickel, or alloys thereof. The first and second negative dielectric materials may be identical or different. For the positive dielectric material, there may be a great deal of materials used, inclusive of silica (silicon oxide), titanium oxide, niobium oxide, aluminum oxide, zinc oxide, tantalum oxide, magnesium oxide, hafnium oxide, silicon nitride, silicon carbide, and magnesium fluoride. However, it is to be noted that even with resonators of the same size, there are variations in the wavelength where resonance takes place, the degree of boosting up electric fields, etc. from material to material.

In what follows, reference will be made to electromagnetic wave resonators that are periodically arranged in the X-axis direction; however, one single electromagnetic wave resonator may be used or multiple resonators may be arranged at non-periodic intervals. How many resonators or what array resonators are arranged in may optionally be selected depending on what purpose they are used for, and various other conditions.

As already emphasized above, there is no need for thermal excitation in the invention, but it is a matter of course that if the whole resonator structure is heated, it may be used as a heat radiation light source as is quite the case with the electromagnetic wave resonator referred to as the prior art.

Referring to another application of the electromagnetic wave resonator of the invention, it may be set up in a biochip form capable of scattering a sample thereon to detect molecules through the enhanced Raman scattering or enhanced fluorescent phenomena with higher sensitivity. In yet another application, positive dielectric thin films may possibly be applied as semiconductor or dye thin films in the laser field. It is thus to be noted that a broad range of applications and modifications could be possible, and all of them could be embraced in the invention.

EXAMPLES

First Example

FIG. 1 is illustrative in the XZ section of the electromagnetic wave resonator that is the first example of the invention. On the surface of the first negative dielectric material 1, rectangular grooves, each one extending linearly in the Y-axis direction and having a width $P_1+T$ and a depth D, are arranged in a period $P_1+P_2$. A positive dielectric thin film 3 having a thickness T is formed along the internal surface of each or the groove. The thickness T here satisfies the following relations: T<D and T<$P_1$, so there is a rectangular groove of $P_1-T$ in width and D−T in depth formed on the internal surface of the positive dielectric thin film 3 too. This rectangular groove is filled up with a second negative dielectric material 2.

As previously stated, there are surface waves of multiple modes present in a slab waveguide having a positive dielectric core clad by negative dielectric materials, but what is utilized here is the surface wave of the lowest order mode, more exactly, the surface wave that has an electric field component vertical to the positive dielectric/negative dielectric interface, and has no cutoff frequency. Note here that with the aforesaid surface wave, there are two wavelengths: vacuum wavelength $\lambda_O$ and surface wave wavelength $\lambda_P$. However, the "wavelength" simply referred to in the disclosure here is understood to refer to the vacuum wavelength $\lambda_O$. Strictly speaking, there is a slight difference between the wavelengths in air and in vacuo. Still, that difference is so very small that the "vacuum wavelength" is practically understood to refer to a wavelength observed in air.

In previously cited Patent Publication 2, there is the de facto assumption that the slab waveguide takes on a linear shape in the XZ section. By contrast, the invention underlies a new finding that resonance is maintained when the slab waveguide has a curved shape, or even in an extreme case where the slab waveguide is bent at right angles on the way. In that case, the length of the waveguide taken along its center line may be taken as the length L of the waveguide. However, the invention is different from Patent Publication 2 in that both open ends of the waveguide are exposed in the same plane, so resonance of an even-numbered order where the directions of electric fields of both end faces are offset each other is prohibited. In the invention, there is resonance occurring when the length L of the waveguide matches $(1/2)\lambda_P$, $(3/2)\lambda_P$, $(5/2)\lambda_P$, ... of the wavelength $\lambda_P$ of the surface wave.

Referring back to FIG. 1, gold was selected for the first and second negative dielectric materials 1 and 2, and aluminum oxide for the positive dielectric thin film 3. The dimensions of the respective components were $P_1=P_2=130$ nm, D=217 nm, and T=5 nm. This sectional structure extends continuously in the Y-axis direction over a length much longer than those dimensions, for instance, 5 mm. However, if the length in the Y-axis direction is longer than about 5 μm, it will not have any essential influence on the optical properties to be shown later. One possible measure of this length in the Y-axis direction may be more than about the resonance wavelength $\lambda_O$ of that structure.

Figure 2:
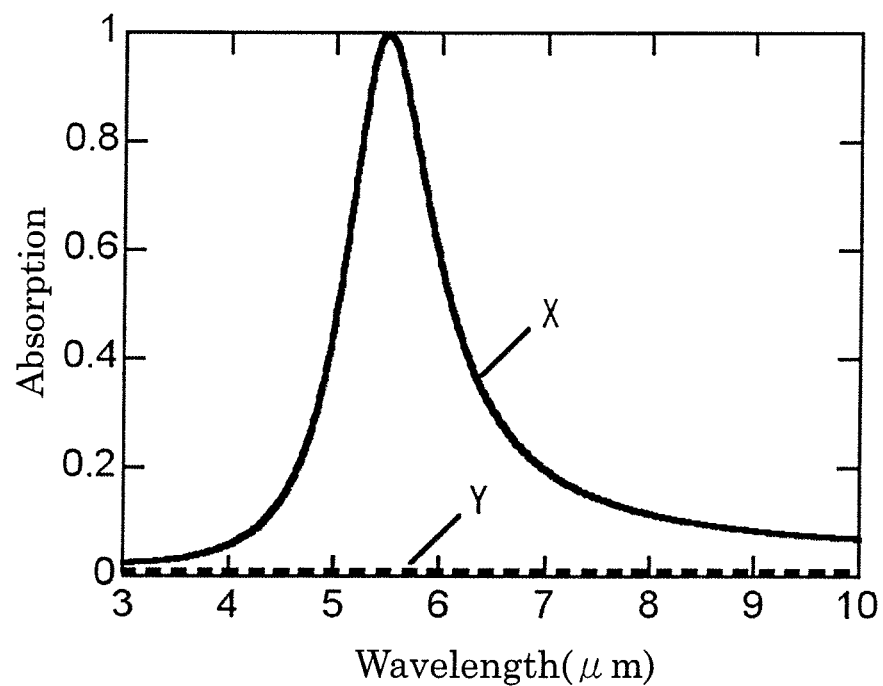
FIG. 2 is an absorption spectrum diagram for the electromagnetic wave resonator illustrated in FIG. 1.

Shown in FIG. 2 are absorption spectra where parallel light is incident on the resonator from the plus Z-direction. Such absorption spectra were calculated by the rigorous coupled wave analysis method capable of numerically solving Maxwell equations for a periodic structure in consideration of the wavelength dependency of gold's complex permittivity in the infrared range. From the studies made so far in the art, it has been broadly accepted that in a region where at least T is greater than 3 nm, the results of calculation well matches the results of experimentation. In FIG. 2, there are two spectra shown, corresponding to different polarization directions, respectively. For X-polarized incident light, this resonator exhibits nearly 100% absorption at the wavelength ($\lambda_O$) of 5.5 μm. At this time, the multilayered structure made up of the first negative dielectric material, the positive dielectric material and the second negative dielectric material works as a slab waveguide 7 that are bent twice on the way with both end faces 8 providing open edges, bringing about plasmon resonance. In this example, the plasmon resonance triggers an absorption-enhancement phenomenon, so the point of resonance is observed as an absorption maximum. In this specific example, the slab waveguide takes on a metal/dielectric/metal structure as can be seen from the drawing. For Y-polarized light, on the other hand, the surface plasmon is not excited on the negative dielectric/positive dielectric interface, so the XY surface of this resonator behaves the same way as a plain gold flat plate. That is, there is no resonance occurring, resulting in only feeble absorption.

Figure 3:
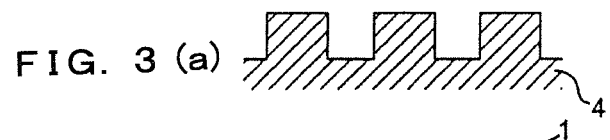
FIG. 3 is illustrative of the steps of fabricating the electromagnetic wave resonator illustrated in FIG. 1.
Figure 3:
Figure 3:
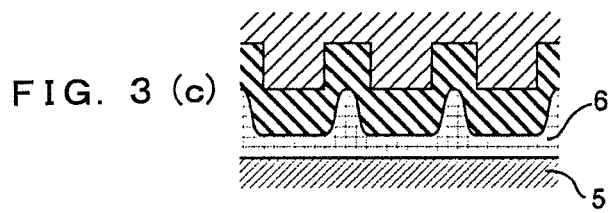
Figure 3:
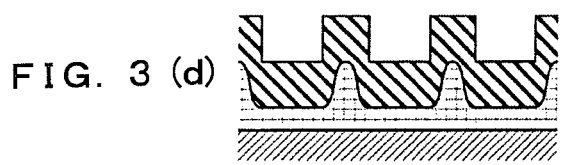
Figure 3:
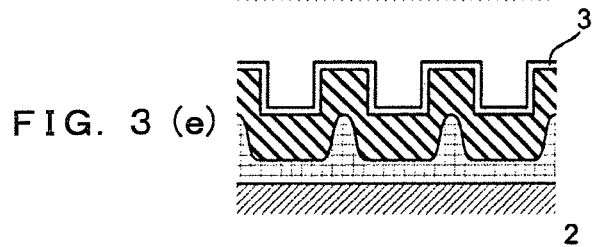
Figure 3:
Figure 3:
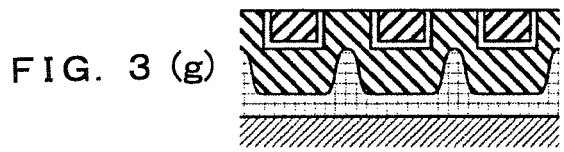

Shown in FIG. 3 are the steps of fabricating the resonator of FIG. 1. First of all, there is the first substrate 4 provided, on which projections, each one having a width $P_1+T$ and a height D' (D'>D), are arranged in a period $P_1+P_2$, using silicon with a general semiconductor processing technology (FIG. 3(a)). On that substrate, a gold film of 100 nm or more in thickness is formed as the first negative dielectric material 1 by DC magnetron sputtering (FIG. 3(b)). This is in turn bonded to the second substrate 5 made of glass by means of an epoxy adhesive material 6 (FIG. 3(c)). Then, the first substrate 4 is dissolved in a potassium hydroxide solution capable of selectively etching silicon alone (FIG. 3(d)). Thus, the grooves of $P_1+T$ in width and D' in height are arranged in the period $P_1+P_2$. For these steps, any desired fabrication process may be used if such a structure is obtainable. For instance, while the first negative dielectric film 1 of sufficient thickness is formed on the second substrate 5, a periodical resist mask may be formed on that film 1 by a general semiconductor processing technology. Then, the first negative dielectric material is vertically dug to a given depth by a dry etching technology, followed by removal of the resist. Alternatively, if the first substrate 4 provided with periodical projections is, rather than silicon, a polymer prepared from the silicon master by a nano-printing transfer technology, then mass fabrication is feasible at lower costs. The polymer substrate may be dissolved in an organic solvent such as xylene, and toluene. Alternatively, the first substrate 4 may be mechanically peeled off without subject to dissolution. Indeed, the adhesion of gold to silicon or polymer is generally weak so that peeling is relatively easily achievable without leaving any residue behind.

In the step of FIG. 3(e), by means of an atomic layer deposition (ALD) method, an aluminum oxide film of T in thickness is uniformly formed as the positive dielectric thin film 3 on the surface of the first negative dielectric material 1. On that, there is the second negative dielectric film 2 formed at a thickness enough to sufficiently fill up the grooves formed by the surface of the positive dielectric thin film 3 (FIG. 3(f)). Finally, by means of a chemomechanical polishing (CMP) method, the projections from the second negative dielectric material 2 are polished off to expose the positive dielectric thin film 3, and the uppermost portion of the positive dielectric thin film 3 is polished off and polishing is implemented until the groove depth of the first negative dielectric material 1 is turned from D' to D (FIG. 3(g)). Thus, the resonator structure of FIG. 1 gets completed.

When the material capable of forming a stable oxide or nitride film of aluminum as an example is selected for the first negative dielectric material 1, the step of FIG. 3(e) may be implemented such that the positive dielectric thin film 3 is precipitated from the first negative dielectric material 1 by means of spontaneous oxidation, plasma oxidation, plasma nitriding or the like, without recourse to film formation. For the step of FIG. 3(e), just only the ALD method but also a chemical vapor deposition method, high-frequency magnetron sputtering, ion beam sputtering, an evaporation method and other film-formation technologies may be used (this will also be true for the corresponding step of other examples).

In the final polishing step, it is desired to process the groove depth D of the first negative dielectric material 1 with nanometer-order precision (this will also be true for the corresponding step of other examples). To this end, while reflection spectra off the surface being polished are optionally measured during polishing, polishing may be implemented until the target spectra are observed (in the case of vertical incidence, there is a minimum value obtained at the target resonance wavelength). Alternatively, dry plasma etching may be used instead of the wet CMP method. In that case, it is also possible to provide real-time monitoring of reflection spectra during polishing.

It is important for the foregoing process that none of technically sophisticated steps are involved throughout it. In the previously cited Patent Publication 1, there was the need for a very sophisticated processing technology capable of achieving a groove structure of 100 to 155 nm in width and 6.6 to 7.3 in aspect ratio for the purpose of bringing about resonance at the same wavelength as applied herein. However, the microstructure that had to be prepared in FIG. 3(a) or FIG. 3(d) was a groove or projection having a width: $P_1+T=135$ nm, a height: $D'=250$ nm as an example, and an aspect ratio of 1.9. Such dimensions are too small to achieve with general lithography, but they are easily achievable by nano-imprinting comprising transfer of the mold itself, or nano-imprinting lithography comprising resist processing plus dry etching.

Second Example

Figure 4:
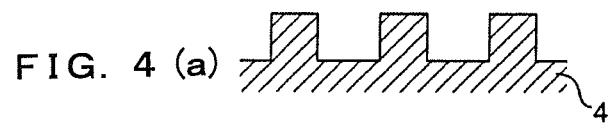
FIG. 4 is illustrative of alternative steps of fabricating the electromagnetic wave resonator illustrated in FIG. 1.
Figure 4:
Figure 4:
Figure 4:
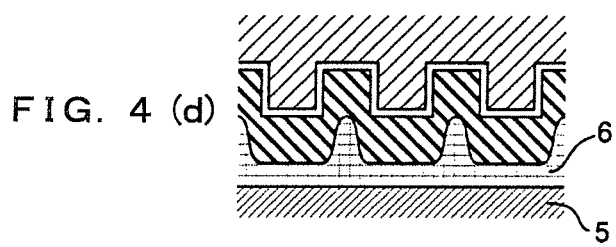
Figure 4:
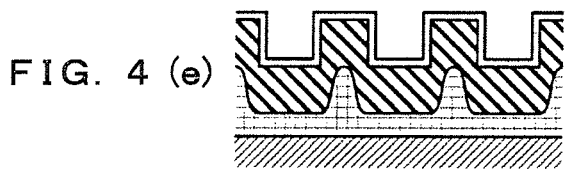
Figure 4:
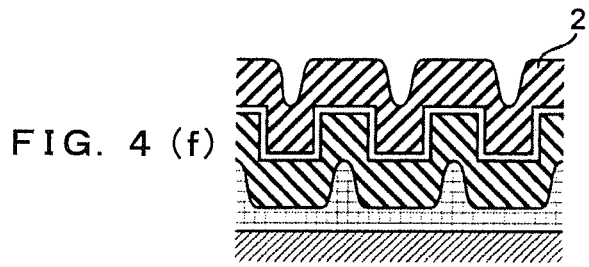
Figure 4:
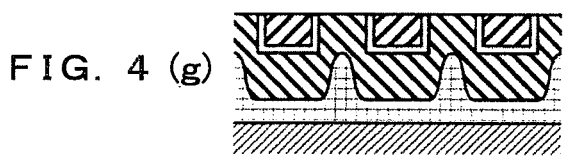

Shown in FIG. 4 is the second example of the invention wherein the resonator of FIG. 1 is fabricated through another set of steps. First of all, there is the first substrate 4 provided, on which projections, each one having a width $P_1-T$ and a height D' (D'>D), are arranged in a period $P_1+P_2$, using silicon with a general semiconductor processing technology (FIG. 4(a)). On that substrate, an aluminum oxide film having a thickness T is uniformly formed as the positive dielectric thin film 3 by the ALD method (FIG. 4(b)). The merit of starting the process with this step is that in the ALD method the conditions for film formation on silicon are well established, so there is quite no need for making modifications to them. Then, a gold film of 100 nm or more in thickness is formed by DC magnetron sputtering as the first negative dielectric material 1 (FIG. 4(c)). The subsequent steps: the step of bonding the assembly to the second substrate 5 of glass by the epoxy adhesive material 6 (FIG. 4(d)), the step of dissolving the first substrate 4 in a potassium hydroxide solution capable of selectively etching silicon alone (FIG. 4(e)), the step of forming a the second negative dielectric film having a sufficient thickness (FIG. 4(f)), and the step of implementing polishing by the CMP method until the groove depth of the first negative dielectric material 1 is turned from D' to D (FIG. 4(g)), are the same as in the example of FIG. 3.

In the step of FIG. 4(b), the oxide, nitride or carbide of silicon may be precipitated as the positive dielectric thin film 3. In that case, however, there is the need for adjusting the projection dimensions on the first substrate 4 such that the final dimensions become the desired dimensions.

Incidentally, it is noted that in order for the inventive electromagnetic wave resonator to operate as a resonator, it is not always necessary to achieve the morphology of FIG. 1 exactly. It does not matter if the positive dielectric thin film 3 remains quite unpolished, as shown typically in FIG. 5(a). In that case, it does not matter if the second negative dielectric material 2 is polished a bit more, giving some levels on the very surface of the resonator (FIG. 5(b)). There is no problem even when portions of the vertical wall of the positive dielectric thin film 3 project out of the surrounding negative dielectric material portions (FIG. 5(c)) or, inversely, there are dents in that vertical wall (FIG. 5(d)). In practical applications, it may be a matter of nature that even the CMP method effective for flattening ends up with these processed states at a few nm levels discussed here, because there is a difference in the polishing speed from material to material. In any case, the resonance wavelength is variable in response to such a slight difference, but the necessary resonator could be obtained if the point of termination of polishing is detected while monitoring the reflection spectra.

In practical applications, it is desired that protective thin film 9 of silica or the like is formed on the very surface of the resonator to prevent exposure of the nano-structure on condition that it has no practically adverse influence. In that case, it is necessary to make resonator design while allowing for a change in the resonance wavelength variable depending on the refractive index of the protective thin film 9 from the outset.

Figure 5:
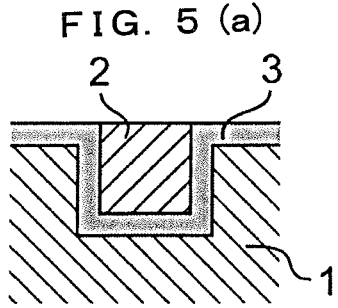
FIG. 5 is illustrative of the versatility of detailed states of the end face of the electromagnetic wave resonator according to the invention.
Figure 5:
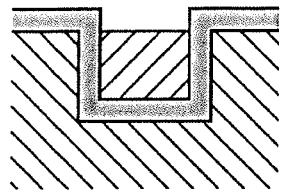
Figure 5:
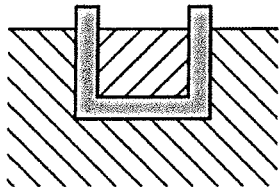
Figure 5:
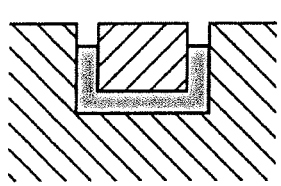
Figure 5:
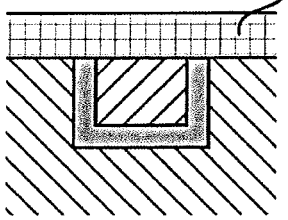

It is here to be noted that the matters explained with reference to FIG. 5 may be equally applied to all the examples of the invention as is the case with other matters.

Third Example

Figure 6:
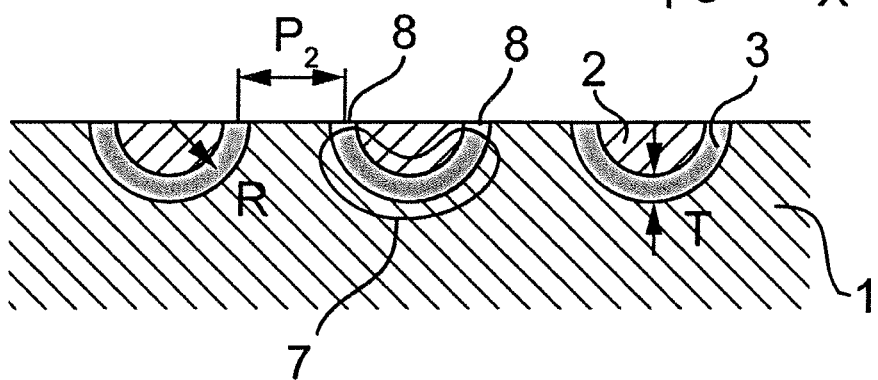
FIG. 6 is illustrative in the XZ section of the electromagnetic wave resonator that is the third example of the invention.

FIG. 6 is illustrative in the XZ section of the electromagnetic wave resonator that is the third example of the invention. A difference from the first and second examples lies in the sectional shape of the resonator. The resonance utilized herein is plasmon resonance in the slab waveguide 7 with both end faces 8 kept in open end form. The resonance wavelength $\lambda_O$ is nearly determined by relations between the length L of the waveguide along its center axis and the wavelength $\lambda_P$ of the surface wave, and the shape made by that waveguide has no substantial influence on resonance. In the first and second examples, the waveguide is bent twice at 90° on the way, whereas the waveguide of the third example merely assumes on a semi-circular arc shape.

More specifically, grooves, each one having a semi-circular section whose radius is $R+T/2$, are arranged on the first negative dielectric material 1 in a period $2R+P_2$, and the positive dielectric thin film 3 having a thickness T is formed along the internal surface of each or the groove. The thickness There satisfies a relation: T<2R, so the internal surface of the positive dielectric thin film 3, too, is provided with a groove having a semicircular section defined by a radius R−T/2. This groove is filled up with the second negative dielectric material 2.

Figure 7:
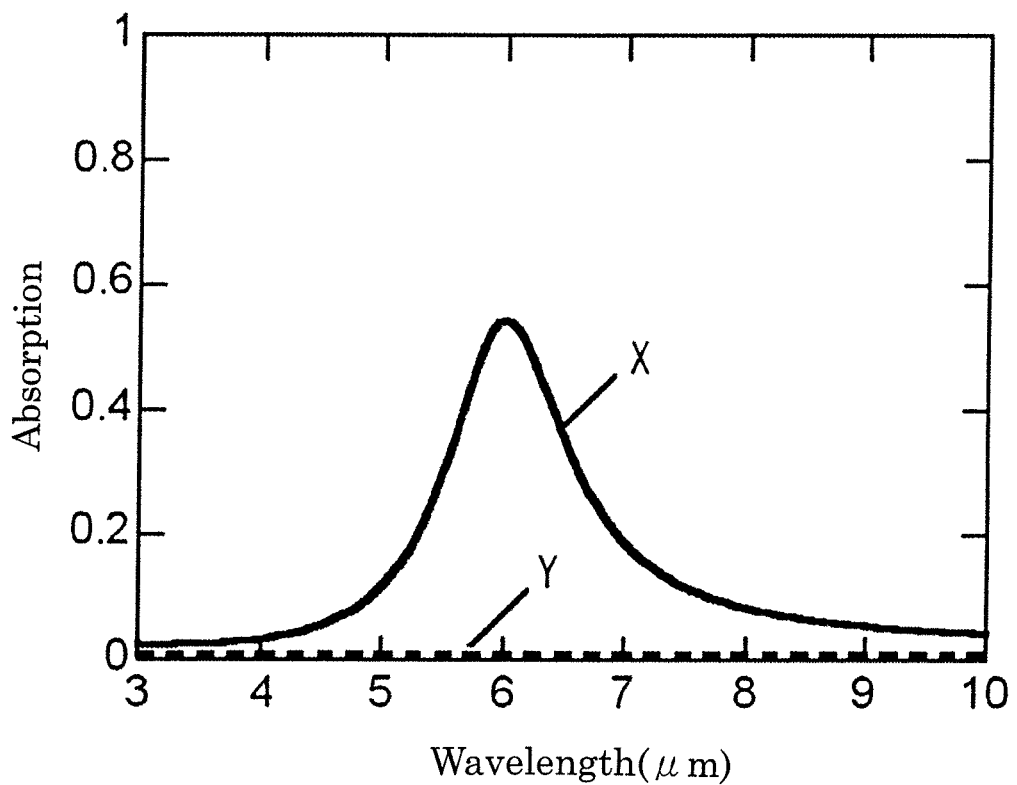
FIG. 7 is an absorption spectrum diagram for the electromagnetic wave resonator illustrated in FIG. 6.

In this example, too, gold was selected for the first and second negative dielectric materials 1 and 2, and aluminum oxide for the positive dielectric thin film 3. The dimensions of each component were R=178 nm, $P_2$=2R=356 nm, and T=5 nm. This sectional structure extends continuously about 5 μm in the Y-axis direction. Shown in FIG. 7 are reflection spectra in the case of the incidence of parallel light on this resonator from the plus Z-direction. As in FIG. 2, there are two spectra shown, corresponding to different polarization directions calculated by the rigorous coupled wave analysis method. For X-polarized incident light, the resonator shows 55% absorption at the wavelength ($\lambda_O$) of 6.0 μm. The length L of the waveguide along its center axis is substantially the same as in the first and second examples, so there is practically little difference from FIG. 2 in terms of the center wavelength and sharpness of resonance. A significant difference from FIG. 2 is that the absorption peak remains low, because the resonators are sparser than those in the structure of FIG. 2. For Y-polarized light, on the other hand, the resonator shows only feeble absorption as is the case with a plain gold flat sheet.

Figure 8:
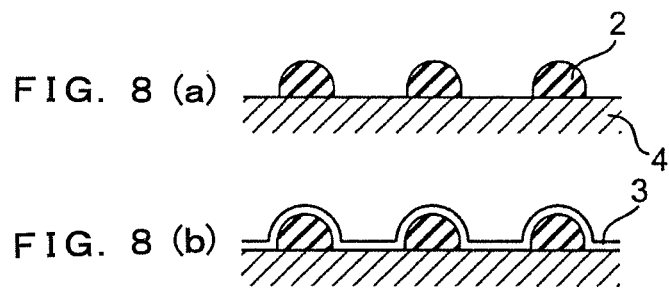
FIG. 8 is illustrative of the steps of fabricating the electromagnetic wave resonator illustrated in FIG. 6.
Figure 8:
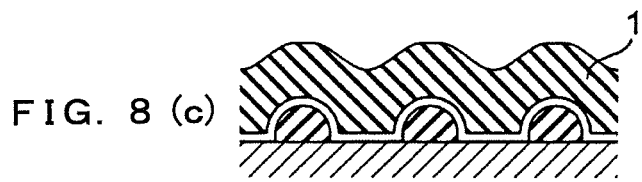
Figure 8:
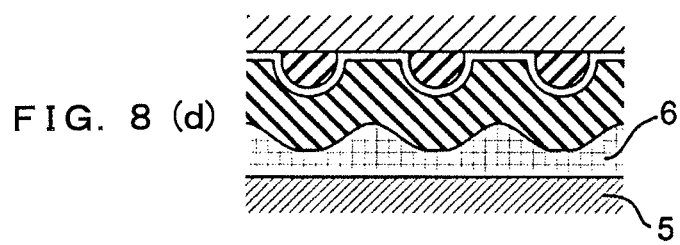
Figure 8:
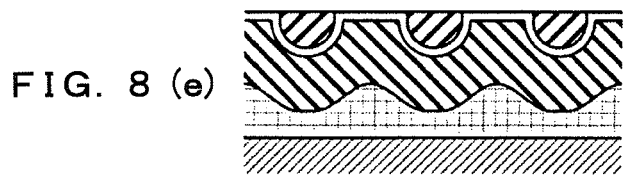
Figure 8:
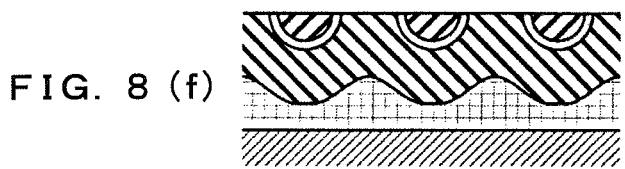

Shown in FIG. 8 are the steps of fabricating the resonator of FIG. 6. First of all, gold stripes, each one having a nearly semicircular section defined by a width 2R−T and a thickness R' (R'>R−T/2), are arranged as the second negative dielectric material 2 on the first substrate 4 of silicon at a period 2R+$P_2$ (FIG. 8(a)). Such a structure may be achieved by forming a gold film having a thickness R' on the first substrate 4, then spin coating an ultraviolet-curable resin on that substrate, then configuring the sectional shape of the ultraviolet-curable resin in the same shape as in FIG. 8(a) by the ultraviolet nano-imprint method using a properly shaped mold, and finally dry etching the whole assembly. On that assembly, an aluminum oxide film having a thickness T is uniformly formed as the positive dielectric thin film 3 by the ALD method (FIG. 8(b)). Then, a gold film of 100 nm or more in thickness is formed as the first negative dielectric material 1 by DC magnetron sputtering (FIG. 8(c)). The subsequent steps: the step of bonding the assembly to the second substrate 5 of glass by the epoxy adhesive material 6 (FIG. 8(d)), the step of dissolving the first substrate 4 in a potassium hydroxide solution capable of selectively etching silicon alone (FIG. 8(e)), and the step of implementing polishing by the CMP method until the desired spectra are obtained (FIG. 8(f)), are the same as in the examples of FIGS. 3 and 4.

A merit of this fabrication process is that the step of isolating the second negative dielectric material 2 unit by unit gets completed as the first step of the process before the final CMP method is implemented. For this reason, the completed resonator may be obtained early in the process. In the stage of FIG. 8(c) as an example, there has been a resonator already obtained by the incidence of light from the first substrate 4 side. In other words, the process steps may be designed such that the resonator has been completed in this stage. Because silicon transmits infrared radiation, the first substrate 4 may be considered as playing a role of the protective thin film 9 as it is. Alternatively, the stage of FIG. 8(d) where the second substrate 4 is bonded may be regarded as the stage of completion. In these cases, design should be implemented while allowing for a change in the resonance characteristics due to the presence of the first substrate 4. Yet alternatively, FIG. 8(e) from which the first substrate 4 is removed may be considered as the stage of completion.

Fourth Example

Figure 9:
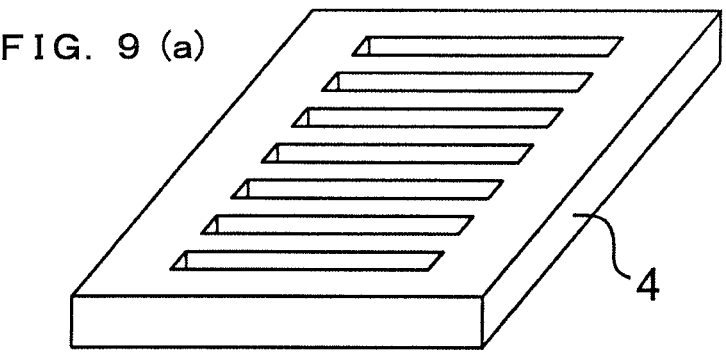
FIG. 9 is illustrative of the general outline of how to fabricate a tunnel light-emission light source according to the fourth example of the invention.
Figure 9:
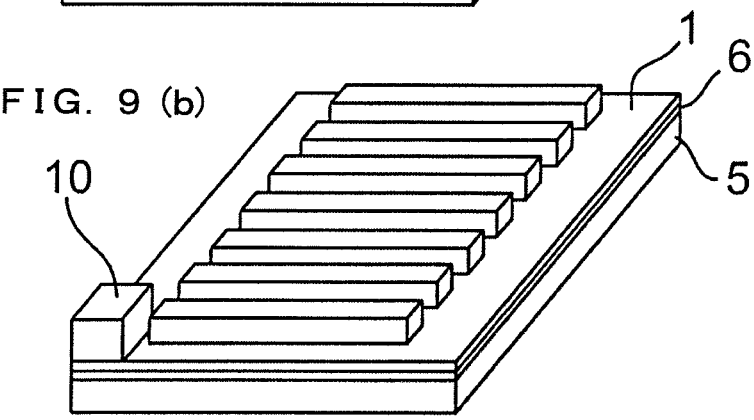
Figure 9:
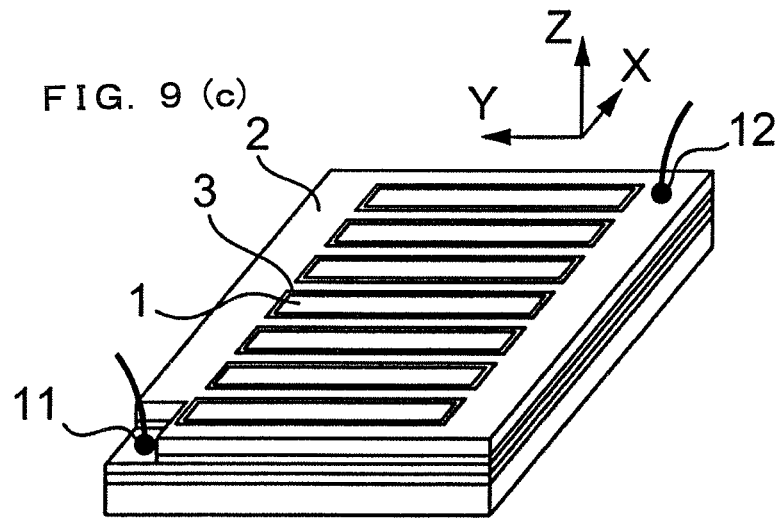

FIG. 9 is illustrative in general outline of the fourth example of the invention: how to fabricate a tunnel light-emission light source making use of the electromagnetic wave resonator that has so far been explained. While the process steps of fabricating the resonator underlie the method shown in FIG. 3, it is to be noted that unless otherwise stated, the method to be explained hereinafter may be applied to other resonator fabrication processes including those disclosed herein. First of all, such a first substrate 4 as depicted in FIG. 9(a) is provided. Then, the gold film is formed as the first negative dielectric material 1 on the first substrate (FIG. 3(b)). Then, the assembly is fixed to the second substrate 5 by means of the adhesive material 6 (FIG. 3(c)), followed by dissolution or peeling-off of the first substrate 4 (FIG. 3(d)). Through these steps, the lattice depicted in the FIG. 9(b) is fabricated. The lattice here is not formed all over the second substrate 5, leaving a blank on its periphery. This is to make connections to electrodes. As an area for connecting an electrode to the first negative dielectric material 1, a mask 10 is provided on the outer periphery as by a photoresist capable of being dissolved later, as shown in FIG. 9(b).

Thereafter, the positive dielectric thin film 3 (FIG. 3(e)) and the second negative dielectric film 2 (FIG. 3(f)) are formed all over the surface, and finally, polishing is implemented from the very surface of the assembly by the CMP method until the desired depth is reached (FIG. 3(g)). Shown in FIG. 9(c) is a state where the mask 10 is dissolved and thereby removed. Where there is the mask 10 removed the first negative dielectric material 1 is exposed, and the first electrode 11 is connected thereto. The negative dielectric material 2 is exposed elsewhere, and the second electrode 12 is connected to wherever appropriate on the outer periphery.

Most of the very surface of FIG. 9(c) is covered with the second negative dielectric material 2, but in the lattice site, the striped area of the first negative dielectric material 1 is exposed in a form covered with the positive dielectric thin film 3 for conduction to the first electrode 11.

Fifth Example

Figure 10:
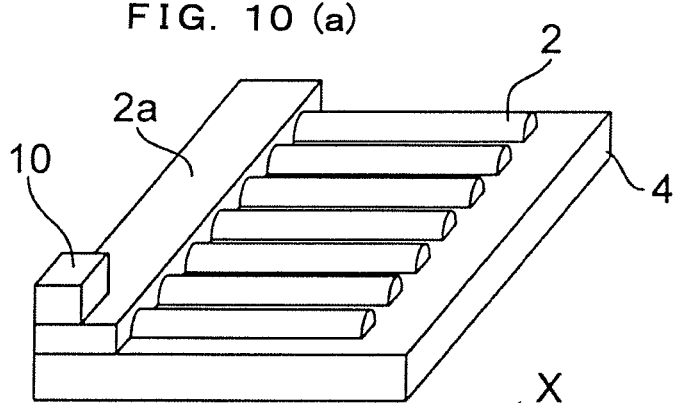
FIG. 10 is illustrative of the general outline of how to fabricate a tunnel light-emission light source according to the fifth example of the invention.
Figure 10:
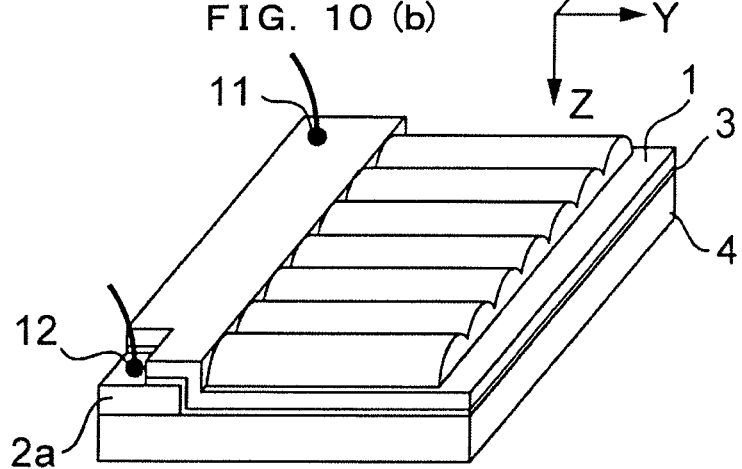

FIG. 10 is illustrative in general outline of the fifth example of the invention: how to fabricate a tunnel light-emission light source making use of the electromagnetic wave resonator fabricated through the steps depicted in FIG. 8. To fabricate an electromagnetic wave resonator capable of receiving voltage between the first negative dielectric material 1 and the second negative dielectric material 2 through the steps of FIG. 8, it is preferable that in the step of FIG. 8(a), the stripes of the second negative dielectric material 2 are formed in a bundle of "so-called comb type electrodes" pattern, as viewed in the XY plane. In FIG. 10(a), the stripes of the second negative dielectric material 2 are coupled to a common rectangular pattern portion 2a, extending out of the rectangular pattern in a parallel comb teeth configuration. As an area for connecting an electrode to the second negative dielectric material 2, there is here a mask 10 provided on the rectangular pattern portion 2a as by a photoresist capable of being dissolved later.

After that, the positive dielectric thin film 3 (FIG. 8(b)) and the first negative dielectric film 1 (FIG. 8(c)) are formed all over the surface. Shown in FIG. 10(b) is a state where the mask 10 is eventually dissolved and thereby removed. Where there is the mask 10 removed the rectangular pattern portion 2a of the second negative dielectric material 2 is exposed, and the second electrode 12 is connected thereto. The first negative dielectric material 1 is exposed elsewhere, and the first electrode 11 is connected to wherever appropriate. Tunnel light-emission occurring upon application of voltage between both electrodes is radiated downward (in the plus Z-direction) in FIG. 10 through the first substrate 4.

By the way, as far as FIGS. 1, 3, 4, 5, 6 and 8 hitherto shown are concerned, there cannot possibly be an electric conduction between the first negative dielectric material 1 and the second negative dielectric material 2. As a matter of fact, however, electric conduction may be made between both via any defect of the positive dielectric thin film 3 or any metal outreaching and remaining on the side of the substrate during film formation. The larger the device area, the more difficult it is to eschew this. Any countermeasure is not shown in FIGS. 9 and 10 for the purpose of avoiding too much complicated illustrations. In practical applications, however, care must be taken to prevent inadvertent conduction and keep insulation going on. This could be achieved by implementing proper masking operation using a photoresist or the like during film formation such that the portions of the first negative dielectric material 1 and the second negative dielectric material 2 that oppose through the positive dielectric thin film 3 are limited to the minimum area necessary to operate as the light source. In other words, it is preferable that at a site other than the portion where there must be the standing waves of surfaces waves necessary for these electromagnetic wave resonators to run the operation needed for their purposes, another film is interleaved between the first and/or the second negative dielectric materials and the positive dielectric thin film so as to prevent direct contact thereof, or the positive dielectric thin film is made thicker elsewhere. This also helps prevent capacitance between both electrodes from growing too high, thereby rendering response speed lower.

Figure 11:
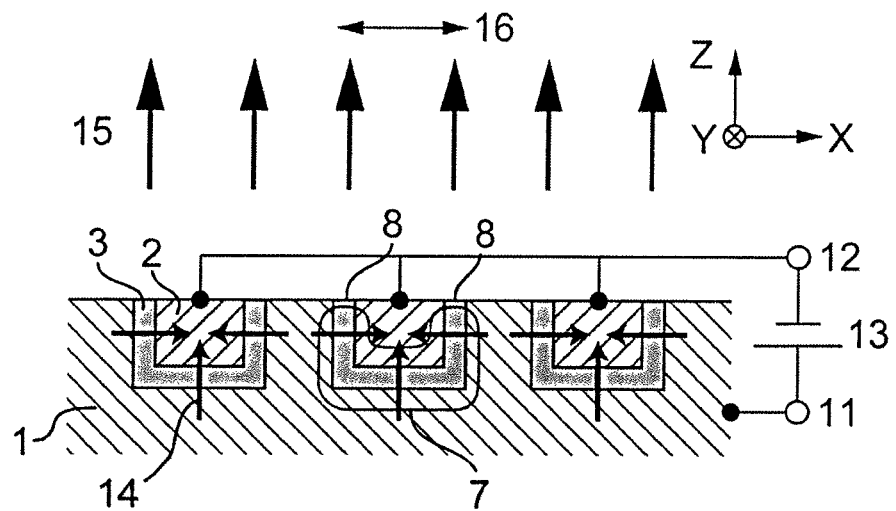
FIG. 11 is illustrative of relations between electrical connections, currents and light emission in a tunnel light-emission light source.

FIG. 11 is illustrative of electrical connections for the tunnel light-emission light source in the fourth example. The voltage source 13 is operable to apply voltage between the first negative dielectric material 1 and the second negative dielectric material 2 that oppose through the positive dielectric thin film 3. At the time when the thickness T of the positive dielectric thin film 3 is 10 nm or less, preferably 5 nm or less, and more preferably 3 nm or less, tunneling currents flow through the positive dielectric thin film 3. This in turn excites the surface plasmon mode of the slab waveguide 7 to emit light out of the end face 8 into a space. Note here that the preferable lower limit to the thickness T of the positive dielectric thin film 3 is 0.2 nm. No matter what voltage was applied to conventional tunnel light-emission light sources, they emitted out light having corresponding wavelengths. In the light source of the invention, however, the length L of the slab waveguide 7 is on much the same level as the wavelength $\lambda_P$ of its surface plasmon mode, and between both end faces 8, there is resonance occurring just as the standing wave is formed. It follows that with the inventive light source, light 15 linearly polarized 16 in the X-axis direction is going to be emitted only at a unique voltage corresponding to the unique wavelength $\lambda_O$ just where there is resonance occurring. The relation involved is given by:

$$eV = hc/\lambda_O$$

where the left side is the energy of electrons, the right side is the energy of photons in the generated electromagnetic wave, e is the elementary electric charge, V is the voltage of the voltage source 13, h is the Planck constant, c is the velocity of light in vacuo, and $\lambda_O$ is the resonance wavelength.

In reality, however, the voltage to be applied does not exactly match the aforesaid equation, partly because the energy of tunneling electrons deviates from eV by reason of phonon scattering in the tunnel or the like, and partly because the plasmon resonance has a Q value (the sharpness of resonance) that is not that large: the word "wavelength" is an ambiguous one having no greater significance than that. Here take a resonator resonating at $\lambda O=5.5$ μm (V=0.225 V) shown in FIG. 2 as an example. To obtain tunnel light emission at this wavelength, the applied voltage must be about 0.25 to 0.30 V. More generally, it is desired that the voltage is set such that the energy of electrons falls within the range of 100 to 170%, preferably 100 to 140% of the energy of photons in the electromagnetic wave having the resonance wavelength.

So far, there has been none of good light sources capable of emitting a specific wavelength in the infrared range having a wavelength ranging from 2 μm to 10 μm in particular. The light source of the invention gives out light of this wavelength without a hitch, and is capable of room temperature operation and fast modulation, and emitting linearly polarized light as well.

Sixth Example

The sixth example of the invention is directed to a light source making use of electroluminescence (EL emission). This may be achieved by utilizing the portion of the positive dielectric thin film 3 as a light-emitting material rather than as a plain insulation film in FIG. 9. For instance, use may be made of a multilayered structure comprising tris(8-quinolilato) aluminum known as an organic electroluminescent material, a similar organic electron carrier material, an organic hole carrier material and an organic light-emitting material, and ZnS:Mn, ZnS:Cu or the like known as an inorganic electro-luminescent material. To this end, the thickness T of the positive dielectric thin film 3 need not be as small as is the case with tunneling currents; it may have a value suitable for the respective light-emitting materials. In addition, the dimensions of each or the component should be designed such that resonance takes place at the center wavelength of each light-emitting material. In this example, electroluminescent light excites the surface plasmon mode of the slab waveguide 7, thereby giving out light out of the end face 8 of the waveguide.

Seventh Example

Figure 12:
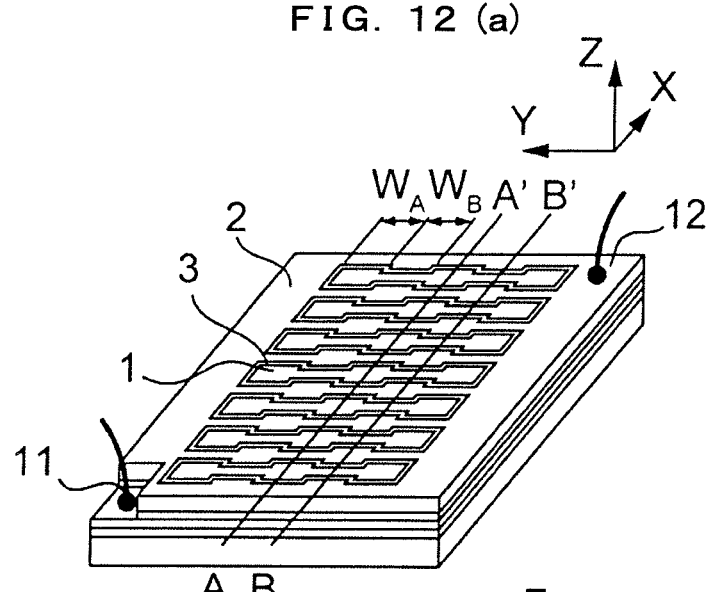
FIG. 12 is illustrative of the general outline of how to fabricate a tunnel light-emission light source according to the seventh example of the invention.
Figure 12:
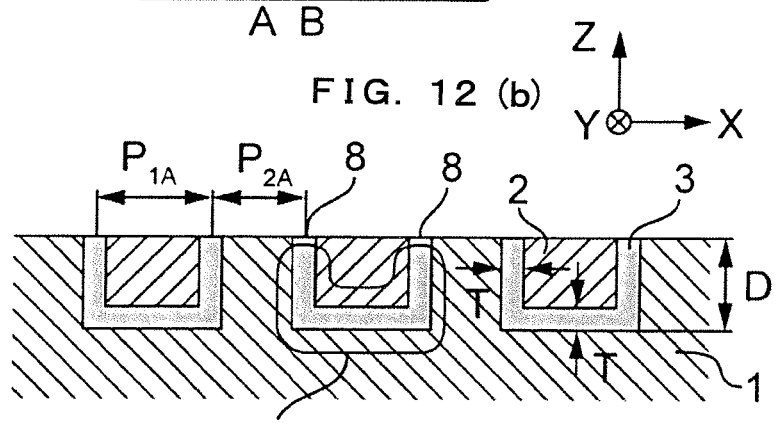
Figure 12:
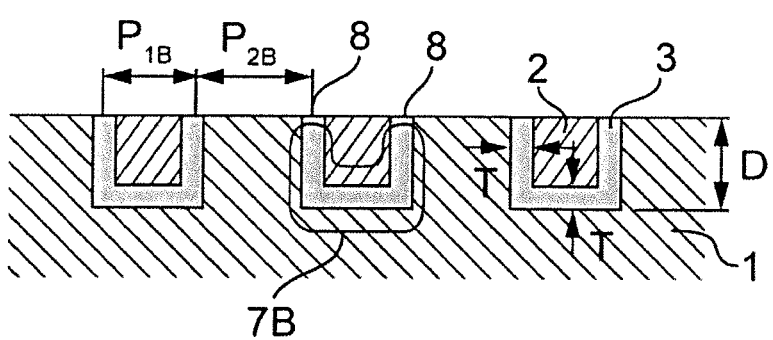

In all the examples so far described herein, the sectional shape of the resonator in the XZ plane is supposed to be constant in the Y-axis direction. However, if resonators that vary in the sectional shape in the XZ plane (components of partially varying sizes are also expressed as components having different sectional shapes) are linked together in order in the Y-axis direction, it could produce a new, unique advantage. A specific example is shown in FIG. 12, wherein rudimental structures and how to fabricate them are supposed to be pursuant to FIG. 9. What is different from FIG. 9 is that there is a variation in the sectional dimensions in the XZ plane from site to site in the Y-axis direction. The XZ sections taken along AA' and BB' in FIG. 12(*a*) are shown in FIGS. 12(*b*) and 12(*b*), respectively. Areas having the respective sections are here called Area A and Area B. Although the depth D of the rectangular groove on the first negative dielectric material 1 and the thickness T of the positive dielectric thin film 3 are common to both areas, it is understood that the width of the groove differs: $P_{1A}+T$ for Area A, and $P_{1B}+T$ for Area B. Here again, the period of the groove is common to both areas: $(P_{1A+P2A}=P_{1B}+P_{2B})$. In both areas, the slab waveguides 7*a* and 7B have different lengths: $L_A=P_{1A}+2D-T$, and $L_B=P_{2B}+2D-T$, respectively. Consequently, Areas A and B resonate at different vacuum wavelengths $\lambda_{OA}$ and $\lambda_{OB}$. As shown in FIG.

12(a), the lengths of Areas A and B that extend continuously in the Y-axis direction are called $W_A$ and $W_B$, respectively.

One such structure is going to have multiple resonance wavelengths alone: mainly two unique advantages. The first advantage is the ability to achieve a single mode resonator. So far, discussions have been made over the optical characteristics in the direction along the Z-axis that is the main direction of the resonator but, strictly speaking, the resonator explained so far herein resonates at wavelengths $\lambda_O$ differing little by little in different directions in the YZ plane in particular. This implies that when the resonator is used as a light-emitting device, light of varying wavelengths is emitted as the direction is shifted from the Z-axis toward the Y-axis, and that when the resonator is used as a biochip or the like, molecules cannot be detected with high efficiency at a given excitation wavelength as the direction shifts out of the Z-axis. This is because when the uniform structure extends continuously a much longer distance than the surface wavelength $\lambda_P$ in the Y-axis direction, there are only surface waves of a specific wavelength $\lambda_P$ resonating exactly in the XZ plane, but surface waves having Y-axis direction components that do not fall within the XZ plane resonate at a variety of wavelengths depending on their directions of travel: this resonator works as a multimode resonator. Here, if the length W ($W_A$ and/or $W_B$) of the Y-axis direction area in particular is set at more than ½ times or less than 3/2 times as long as the wavelength $\lambda_P$ of the surface wave, that area is then going to work as a single mode resonator so that changes in the resonance wavelength due to direction can be held back too. However, the area here must be more or less corrected for the strict dimension of length W by strict calculation according to Maxwell equations as is the case with the relation of $\lambda_P$ to the length L of the waveguide described at [0013].

Another advantage is that when the resonator is used as a tunnel light-emission light source in particular, multiple emission wavelengths can be fast switched by an applied voltage. With the tunnel light-emission light source making use of the inventive resonator, particularly efficient emission is obtainable by the application of a special voltage corresponding to the resonance wavelength, as set forth in the fourth example. Areas A and B differ in the resonance wavelength; if they are switched over to the associated voltages, it then enables the desired area alone to give out light. Never until now are such light sources available.

Figure 13:
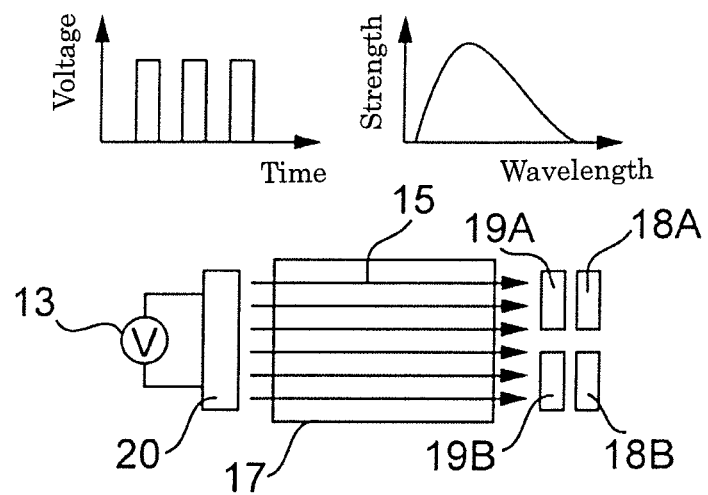
FIG. 13 is illustrative of a comparison of the analyzer using the light source of the invention with a conventional analyzer using nondispersive infrared spectroscopy.
Figure 13:
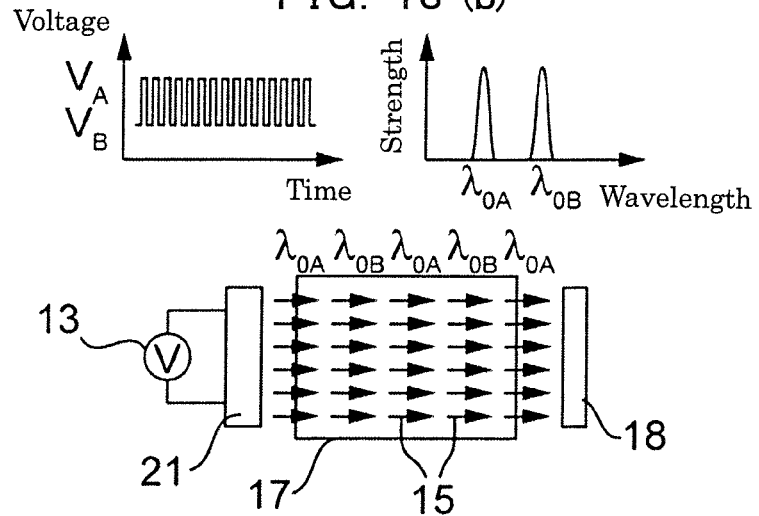

In a nondispersive infrared spectroscopic analysis method that uses absorption of infrared radiation to mainly measure the concentration of a specific molecule in a gas or liquid, there is the concentration figured out making use of the transmittance ratio of signals for two wavelengths: wavelengths $\lambda_{OA}$ and $\lambda_{OB}$ absorbed and unabsorbed by the molecule of interest. Hitherto, two sensors were provided for one blackbody light source, as shown in FIG. 13(a), and band-pass filters capable of transmitting $\lambda_{OA}$ and $\lambda_{OB}$ alone are located in front of the associated sensors. This analytical method was found to be of very poor energy efficiency, because the blackbody light source continuously emits out just only the $\lambda_{OA}$ and $\lambda_{OB}$ necessary for analysis but also infrared light having a broad range of wavelengths, most of which is thrown away without being used for analysis. Also shown in FIG. 13(a) is this emission spectrum. Moreover, the band-pass filters that transmit only a narrow wavelength band in the infrared range were costly parts, because thin-film materials available in the infrared range are very limited, and each film layer must be made thicker corresponding to a longer wavelength. For generally available infrared sensors, it was usually required to modulate the luminance of the light source by a rectangular voltage (with the drive waveform shown in FIG. 13(a)) for lock-in detection, because of their low sensitivity. However, the light source, because of being a thermal one, achieved only slow modulation (of generally less 1 Hz), so it was difficult to achieve fast response analyzers.

If the inventive light source is used, by contrast, an analyzer may be achieved by merely locating a single one detector in opposition to it, as shown in FIG. 13(b). For the inventive light source, there is no need for any expensive filter, because it emits out only a specific wavelength determined by resonator design. In addition, two wavelengths are switched by voltage switching; that is, if wavelengths emitted out of Areas A and B are set at $\lambda_{OA}$ and $\lambda_{OB}$, respectively, as shown in the spectral diagram in the FIG. 13(b), and corresponding applied voltages $V_A$ and $V_B$ are alternately switched (with the drive waveform shown in FIG. 13(b) too), $\lambda_{OA}$ and $\lambda_{OB}$ alone are alternately emitted out, and if they are detected synchronously, then the transmittances of two wavelengths can be measured by a single detector. In addition, the inventive light source boosts up the switching frequency at least more than 1 Hz, typically a few kHz or more, so there is an analyzer achievable that is capable of faster response as much.

While some discussions have been made so far over two areas having different sectional shapes: Areas A and B, it is to be understood that there may be three more areas having different sectional shapes. It does not matter if the lengths $W_A$ and $W_B$ of the respective areas are different or identical, and the periodically alternate arrangement of the respective areas is not always necessary. In short, only the requirement for the respective areas is to have different waveguide lengths L. Alternatively, the areas may differ partly in dimensions as shown in FIG. 12, or comprise a combination of a section of rectangular shape as in FIG. 1 and a section of semicircular shape as in FIG. 6.

SCOPE OF AVAILABILITY IN THE INDUSTRY

First, the present invention provides a novel electromagnetic wave resonator capable of achieving laser light sources, electroluminescent light sources, thermal emission light sources, and high-sensitivity analytical chips, etc.

Second, the present invention contributes much to environmental measurements where the concentration of carbon dioxide or the like in air is measured using infrared radiation in a wavelength range of 2 μm to 10 μm in particular, because the resonator operates at room temperature, has the ability to be fast modulated, and emits out linearly polarized light compatible with a variety of wavelengths.

EXPLANATION OF THE NUMERAL REFERENCES

1: First Negative Dielectric Material
2: Second Negative Dielectric Material
3: Positive Dielectric Thin Film
4: First Substrate
5: Second Substrate
6: Adhesive Material
7: Slab Waveguide
8: Waveguide's End Faces
9: Protective Thin Film
10: Mask
11: First Electrode
12: Second Electrode
13: Voltage Source
14: Tunneling Current
15: Emitted Light
16: Direction of Polarization (the Electric Field)

17: Gas Cell
18: Infrared Detector
19: Band-Pass Filter
20: Black-Body Light Source
21: Two-Wavelength Light Source of the Invention

What is claimed is:

1. An electromagnetic wave resonator harnessing a surface wave, which comprises the following (a), (b) and (c):
   (a) a first negative dielectric material which, when a main direction in and out of which an electromagnetic wave goes is defined by a Z-axis direction of a three-dimensional coordinate system comprising X-, Y- and Z-axes, has a groove extending in a Y-axis direction on a surface turning in a plus Z-direction,
   (b) a positive dielectric thin film provided on an internal surface of the groove on the surface of said first negative dielectric material, and
   (c) a second negative dielectric material provided on a groove formed by a surface of said positive dielectric thin film facing away from said first negative dielectric material.

2. An electromagnetic wave resonator as recited in claim 1, wherein the surface of said first negative dielectric material is provided with a plurality of said grooves in the X-axis direction.

3. An electromagnetic wave resonator as recited in claim 2, wherein said plurality of said grooves are periodically arranged.

4. An electromagnetic wave resonator as recited in claim 1, wherein said groove has a plurality of areas having different widths.

5. An electromagnetic wave resonator as recited in claim 4, wherein said plurality of areas each extend continuously a certain length in the Y-axis direction.

6. An electromagnetic wave resonator as recited in claim 5, wherein a length of said plurality of areas in the Y-axis direction is set ½ times to 3/2 times inclusive as long as a wavelength $\square_P$ of the surface wave.

7. A tunnel emission light source used with a voltage applied between said first negative dielectric material and said second negative dielectric material of the electromagnetic wave resonator as recited in claim 4, characterized in that applied voltages corresponding to different resonance wavelengths of a plurality of areas having different widths in said groove are switched, thereby permitting only a desired area to emit out light.

8. An analyzer used with a voltage applied between said first negative dielectric material and said second negative dielectric material in the electromagnetic wave resonator as recited in claim 4, characterized in that emission wavelengths are preset for a plurality of areas having different widths in said groove, and applied voltages corresponding to the respective emission wavelengths are switched, thereby permitting only the preset wavelengths to be emitted for detection.

9. An electromagnetic wave resonator as recited in claim 1, wherein said positive dielectric thin film has a thickness 10 nm to 0.2 nm.

10. An electromagnetic wave resonator as recited in claim 1, wherein said first negative dielectric material and said second negative dielectric material are electrically conductive, and electrically insulated from each other.

11. An electromagnetic wave resonator as recited in claim 10, wherein said first negative dielectric material and said second negative dielectric material are each a metal.

12. An electromagnetic wave resonator as recited in claim 1, wherein another film is interposed partly between said first and said second negative dielectric material and said positive dielectric thin film, or said positive dielectric thin film is made thicker in one area than in another area.

13. An electromagnetic wave generator device, wherein a voltage is applied between said first negative dielectric material and said second negative dielectric material in the electromagnetic wave resonator as recited in claim 1.

14. An electromagnetic wave generator device as recited in claim 13, wherein the voltage is set such that an energy of electrons produced by voltage application becomes 100 to 170% of an energy of photons in an electromagnetic wave having a resonance wavelength of said electromagnetic wave resonator.

15. A process of fabricating an electromagnetic wave resonator making use of a surface wave, which comprises the following steps (a) to (d):
   (a) providing a linearly extending groove on a surface of a first negative dielectric material,
   (b) providing a positive dielectric thin film on a surface of said first negative dielectric material,
   (c) providing a second negative dielectric material on said positive dielectric thin film, and
   (d) removing said second negative dielectric material flatly from its surface, thereby removing said second negative dielectric material except a portion thereof filled in a groove formed by at least a surface of said positive dielectric thin film.

16. A process as recited in claim 15, wherein said step (b) is implemented by an atomic layer deposition method, a chemical vapor deposition method, sputtering or an evaporation method.

17. A process as recited in claim 15, wherein said step (b) is implemented by oxidizing or nitriding the surface of said first negative dielectric material to form a thin film of an oxide or nitride.

18. A process as recited in claim 15, wherein said step (d) is implemented by a chemomechanical polishing method or plasma etching.

19. A process as recited in claim 15, wherein a part of said second negative dielectric material is removed to expose a part of the surface of said positive dielectric thin film.

20. A process of fabricating an electromagnetic wave resonator making use of a surface wave, which comprises the following steps (a) to (f):
   (a) providing a linearly extending projection on a surface of a substrate,
   (b) providing a positive dielectric thin film on the surface of said substrate,
   (c) providing a first negative dielectric material on said positive dielectric thin film,
   (d) removing said substrate,
   (e) providing a second negative dielectric material on said positive dielectric thin film from which said substrate has been removed, and
   (f) removing said second negative dielectric material flatly from its surface, thereby removing said second negative dielectric material except a portion thereof filled in a groove formed by at least a surface of said positive dielectric thin film on said second negative dielectric material side.

21. A process as recited in claim 20, wherein said step (b) is implemented by an atomic layer deposition method, a chemical vapor deposition method, sputtering or an evaporation method.

22. A process as recited in claim 20, wherein said substrate is silicon, and said step (b) is implemented by forming an oxide, nitride or carbide of said silicon.

23. A process as recited in claim 20, wherein said step (f) is implemented by a chemomechanical polishing method or plasma etching.

24. A process as recited in claim 20, wherein a part of said second negative dielectric material is removed to expose a part of the surface of said positive dielectric thin film.

25. A process of fabricating an electromagnetic wave resonator making use of a surface wave, which comprises the following steps (a) to (c):
   (a) providing a stripe comprising a second negative dielectric material linearly on a surface of a substrate,
   (b) providing a positive dielectric thin film on the surface of said substrate provided with said stripe, and
   (c) providing a first negative dielectric material on a surface of said positive dielectric thin film.

26. A process as recited in claim 25, which further comprises the following step (d):
   (d) removing said substrate.

27. A process as recited in claim 26, which further comprises the following step (e):
   (e) flatly removing a surface appearing by removal of said substrate.

28. A process as recited in claim 27, wherein said step (e) is implemented by a chemomechanical polishing method or plasma etching.

29. A process as recited in claim 25, wherein said step (b) is implemented by an atomic layer deposition method, a chemical vapor deposition method, sputtering or an evaporation method.

30. A process as recited in claim 25, wherein a part of said first negative dielectric material is removed to expose a part of the surface of said positive dielectric thin film.

\* \* \* \* \*